United States Patent [19]
Charpentier

[11] 3,976,166
[45] Aug. 24, 1976

[54] AIRPORT TRANSFER VEHICLE

[76] Inventor: Jean G. Charpentier, 19 rue Eugene Cretel, Massy, France

[22] Filed: Jan. 14, 1975

[21] Appl. No.: 540,962

[30] Foreign Application Priority Data
Jan. 17, 1974 France ............................. 74.01619

[52] U.S. Cl. .................................. 187/19; 52/108; 182/41; 187/9 E
[51] Int. Cl.² ........................................ B66B 11/04
[58] Field of Search ............. 187/1 R, 9 R, 9 E, 17, 187/19; 182/40, 41; 254/95; 52/108

[56] References Cited
UNITED STATES PATENTS
1,155,958  10/1915  Rickard ............................ 182/41 X Primary Examiner—James B. Marbert
Assistant Examiner—James L. Rowland

[57] ABSTRACT

Elevating device, especially for raising and lowering the cabin of a transfer vehicle to the level of an aircraft hatchway, including an upright pusher chain mounted in a first guide sheath and connected at its upper end to the cabin. The first guide sheath is slidable within a second upright guide sheath mounted on the vehicle. A lower section of the chain extends through the second guide sheath to a driving sprocket. A link pin at the upper end of the lower section bears on the lower end of the first guide sheath so that as the chain is moved upwardly by the driving sprocket, the first guide sheath is extended from the second guide sheath and the upper section of the chain pushes the cabin upwardly. The links of the chain form a rigid pusher except that they are permitted to flex around the driving sprocket. The guide sheaths are fitted inside protecting and reinforcing telescopic masts extending between the chassis of the vehicle and the cabin.

7 Claims, 5 Drawing Figures

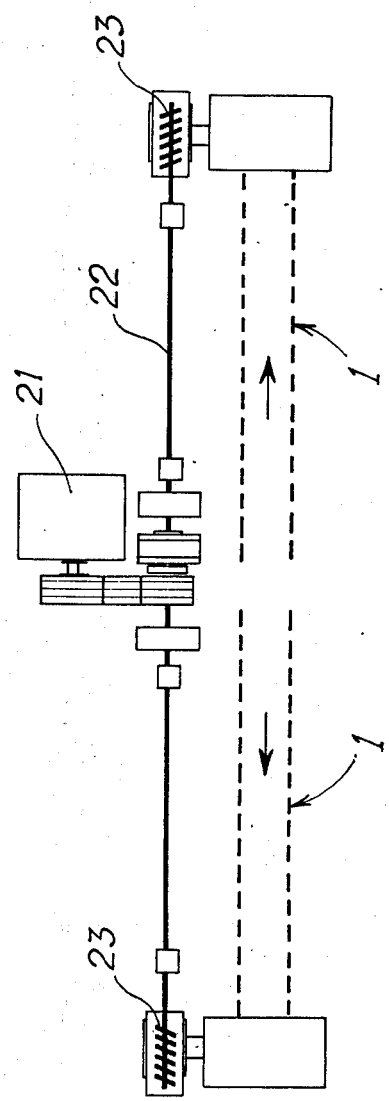

AIRPORT TRANSFER VEHICLE

The invention relates to a lifting device for the cabin of a passenger transfer vehicle at an airport.

Such vehicles which enable passengers to be carried up to the level of the entry door of an aircraft have already been proposed, but they involve a lifting device including a jack which, in view of the need to raise the cabin by more than three meters, must extend higher than the cabin and thus make the vehicle inconveniently high.

An object of the invention is therefore to replace the known jack device by a lifting device which enables the lifting device to be accommodated beneath the top of the cabin.

According to the invention a lifting device, especially for the cabin of a passenger transfer vehicle as used in airports, comprises an upwardly-movable pusher chain arranged to run in a guide sheath and movable upwardly and downwardly by a chain-driving motor, the sheath being slidable within a second sheath, surrounding it and integral with the base of the device, and the chain comprising a first section having central and lateral rollers by which it is guided in the first sheath and a second section having lateral rollers guiding it in the second sheath, the first sheath abutting against the spindle interconnecting the two sections of the chain.

Other features of the invention will emerge from the following description of one form of the lifting device according to the invention with reference to the accompanying drawings. The description and drawings are given only as an illustrative example which is not in any way restrictive.

In the drawings:

FIG. 5 is a schematic view of a common drive for two devices as shown in FIGS. 1 to 4.

Figure 1:
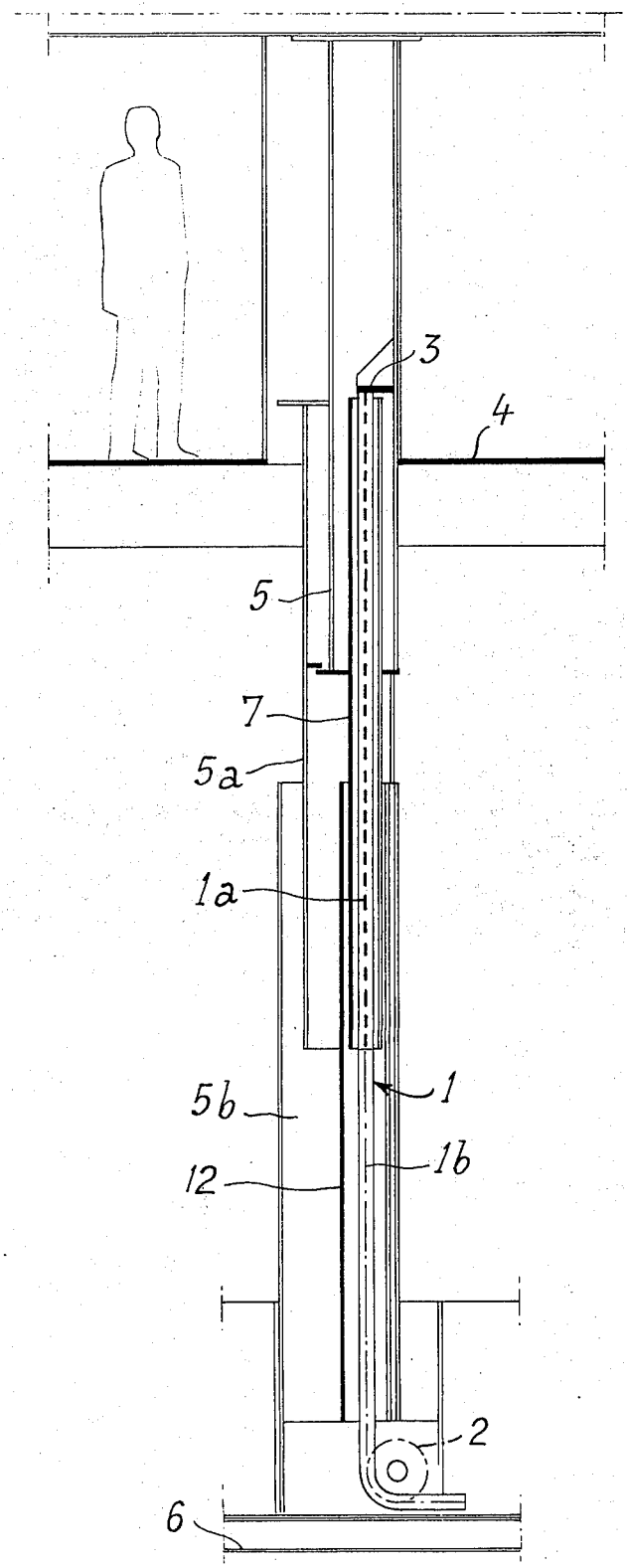
FIG. 1 is a schematic view of the lifting device according to the invention.
Figure 2:
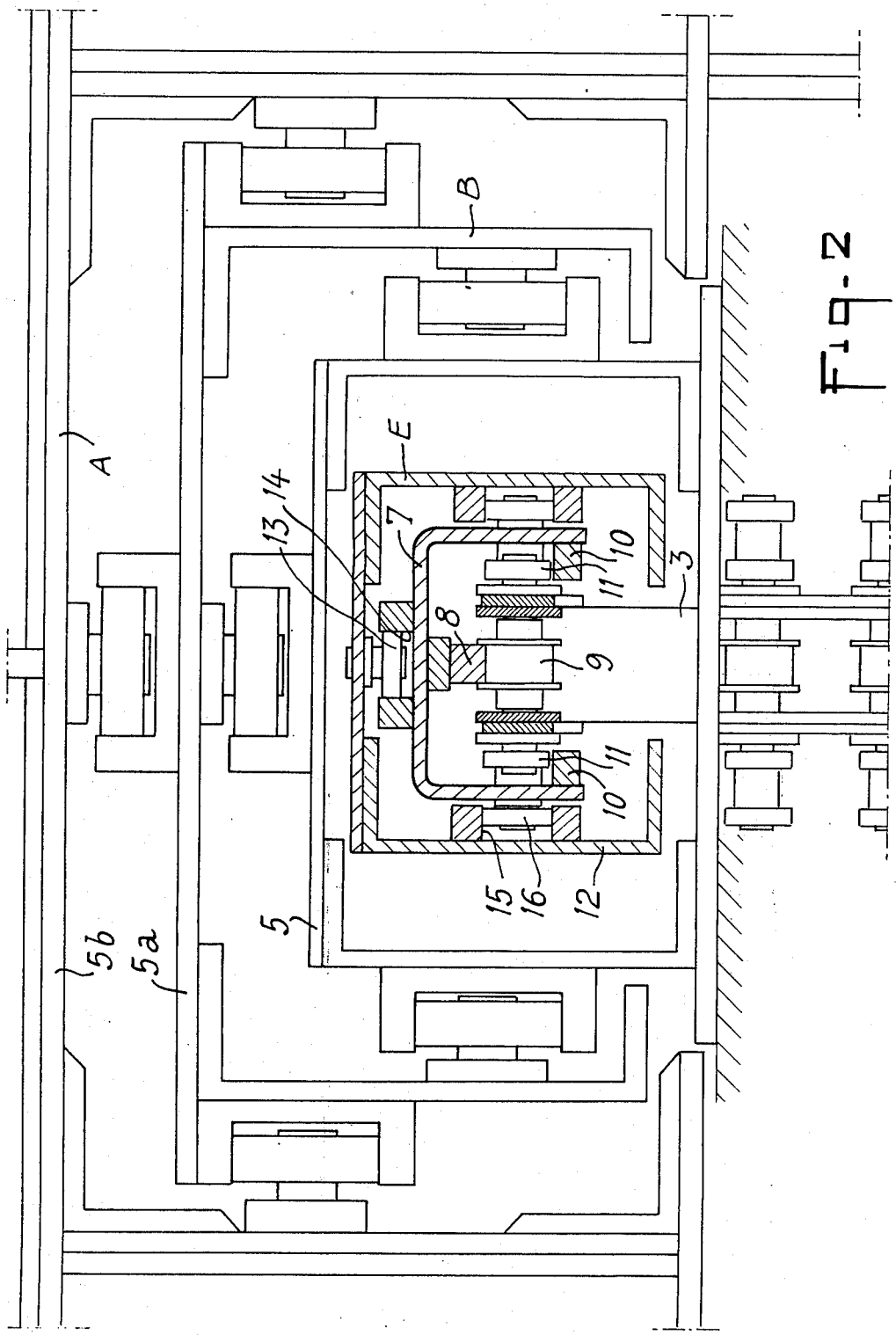
FIG. 2 is a detailed sectional view of the device on a horizontal line as viewed in FIG. 1 and to a larger scale.
Figure 3:
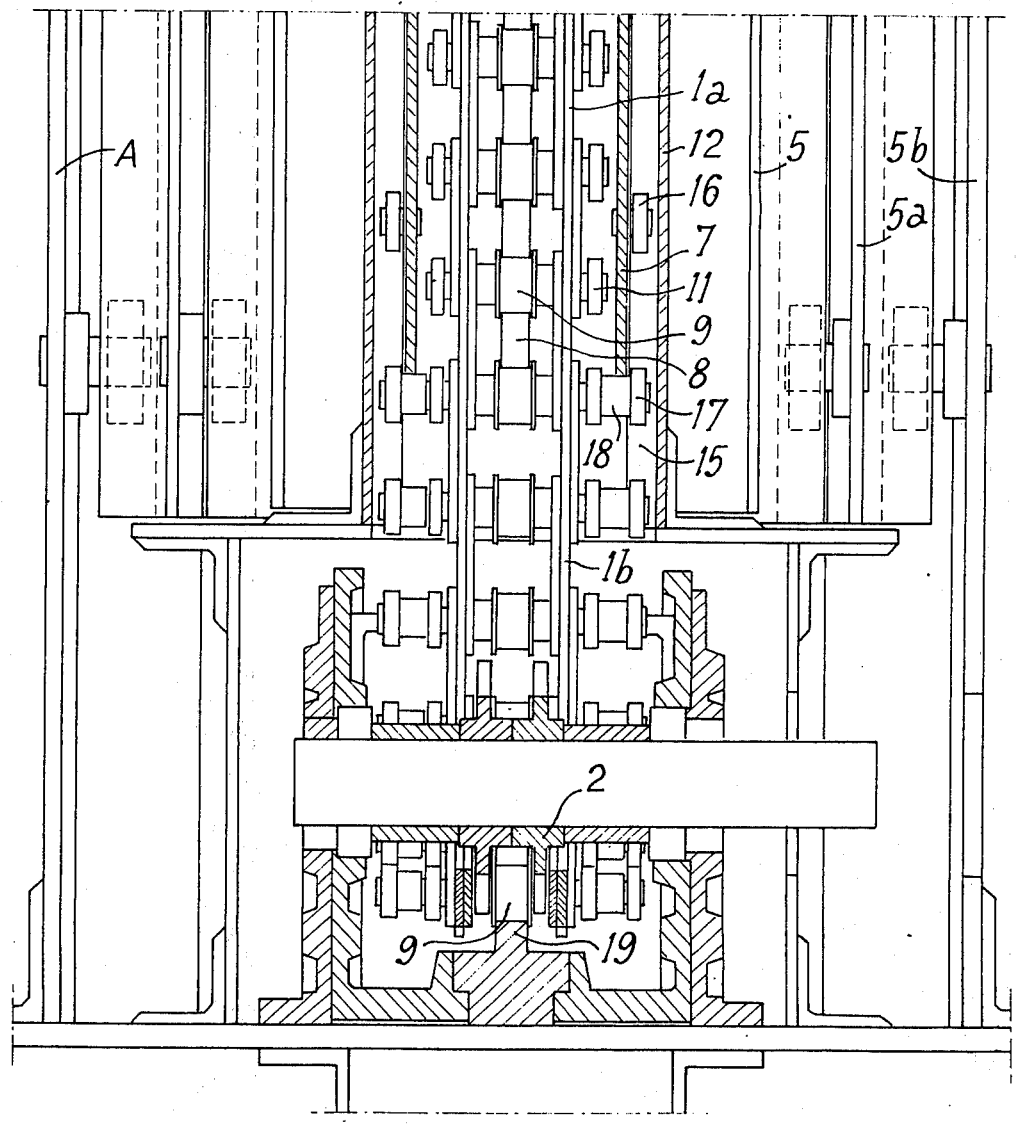
FIG. 3 is a detailed side view of the lower part of the device looking from the right as viewed in FIG. 1 and to a larger scale.

The lifting device is mounted on a vehicle carrying a cabin 4 for transferring passengers at an airport to the level of the entry door of an aircraft. The lifting device shown in FIGS. 1 to 4 comprises a chain 1 driven by a sprocket wheel 2. The upper end of an upright portion of the chain 1 bears against an abutment 3 integral with the cabin 4. The chain is arranged within a telescopic mast comprising three sections 5, 5a, 5b, the section 5 being fixed to the cabin 4 and the section 5b being integral with the chassis 6 of the vehicle. When the mast sections are telescopically retracted the intermediate section 5a will surround the section 5 within the cabin 4 and the intermediate section 5a will be retracted within the lowest section 5b and thus the bottom of the cabin 4 will be close to the chassis 6 of the vehicle.

The chain 1 is guided by two telescopic sheaths, namely a first sheath 7 constructed from a U-section member having a rail 8 for defining a track for central rollers 9 of an upper section 1a of the chain and two tracks 10 for lateral rollers 11 of the upper section of chain. This first sheath 7 is surrounded by a second sheath 12 carrying guide rollers 13 engaging in a channel 14 on the first sheath and channels 15 in which run rollers 16, mounted laterally on the sheath 7, and lateral rollers 17 on a lower section 1b of the chain 1 also having central rollers 9.

The upper secton 1a of the chain has a length substantially equal to that of the sheath 7 which acts as a guide for this section. The lower section 1b of the chain has the lateral rollers 17 thereof, wider apart than the rollers 11 of the upper section and guided within the sheath 12.

The two sections 1a and 1b are connected end-to-end by a link having a spindle provided with sleeves 18 which form driving dogs for the moving sheath 7 within the sheath 12.

The sprocket wheel 2 is formed by a double toothed pinion, the downward thrust of the chain on the wheel 2 being absorbed by a rail 19 along which travel the central rollers 9 of the spindles of the links of the chain. The central rollers 9 each have a shoulder-piece 20 (see FIG. 4) which prevent the chain from curving in the opposite direction from that which it follows round the pinions of the sprocket 2.

Figure 4:
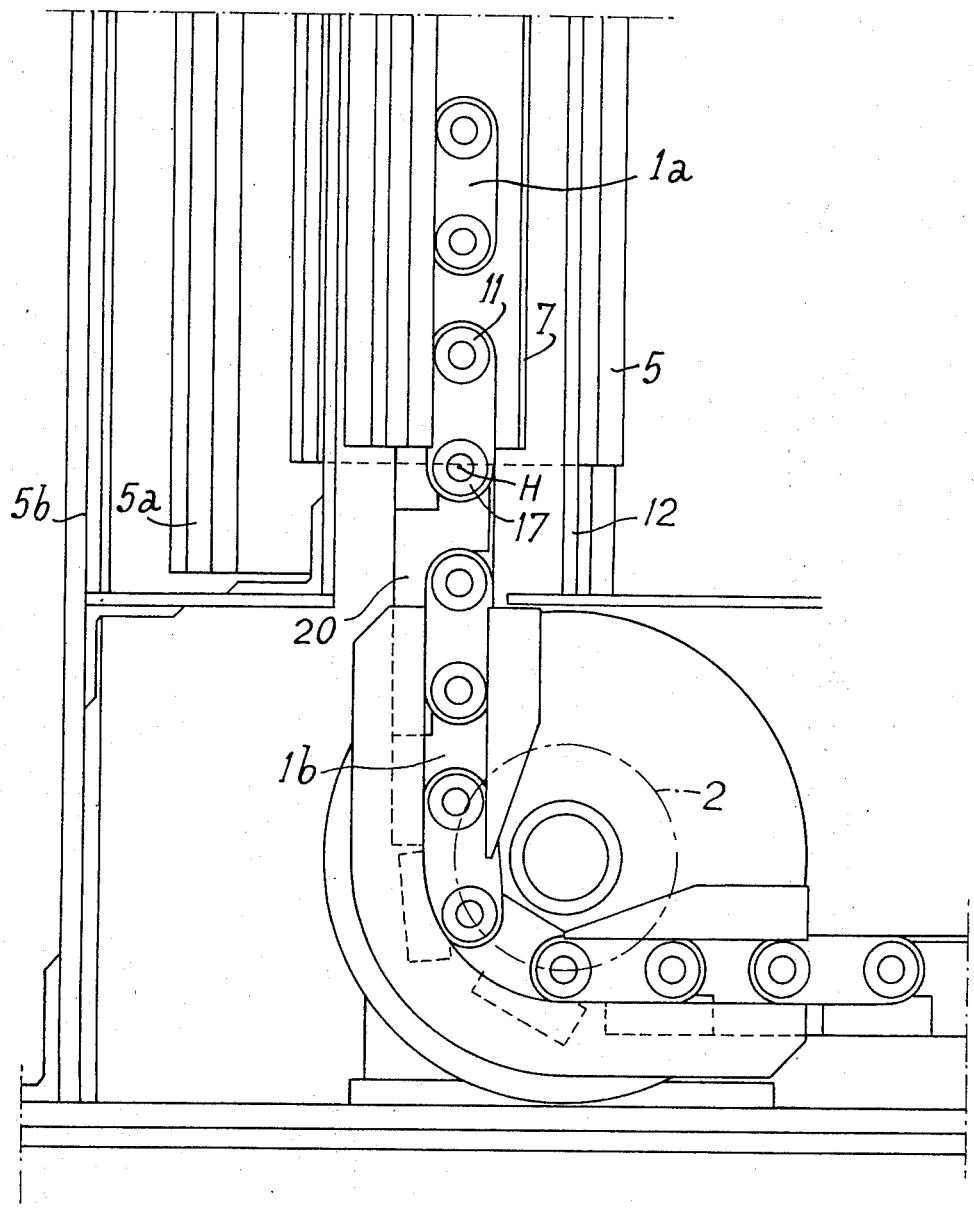
FIG. 4 is a lower part of the device shown in FIG. 1 to a larger scale.

To lift the cabin 4 from the level of the vehicle chassis 6, use is made of two chains as shown in FIG. 5; these are driven by a common motor 21 which drives a shaft 22 which at its two ends carries two identical endless-screw reducing gears 23 which drive the pinions 2. In this way perfect synchronisation of the two chains is achieved. As the chains are moved upwardly, the sleeves 18 engaging on the bottom of the sheath 7 will raise the sheath 7 relatively to the sheath 12 and so the telescopic sections 5, 5a, 5b of the mast will be extended, thereby raising the cabin 4. The upright portions 1a and 1b of the chains form pushers as they cannot flex due to the shoulder pieces 20 on the central rollers 9. To lower the cabin 4, the chains are driven in the downward direction, the lower section 1b of each chain flexing around the toothed pinions of the driving sprocket 2, as indicated in FIG. 4. As the chains 1 are driven in the downward direction, the sheath 7 will be retracted within the sheath 12 and the sections 5, 5a, 5b of the mast will be telescoped one within another.

The invention is not restricted to the only mode or embodiment that has been described and illustrated, but embraces other embodiments in accordance with the invention.

What is claimed is:

1. An elevating device comprising a plurality of chain links pivotally connected together to form a chain having two sections arranged end-to-end, an upright first guide member supporting one of said chain sections for upward and downward movement, said one chain section engaging at a position above said first guide member a member to be elevated, a second upright guide member supporting the other of said chain sections for upward and downward movement relatively thereto, means for guiding said first guide member for telescopic sliding relatively to said second guide member, a driving sprocket mounted beneath said second guide member and engaging the chain whereby said chain is movable upwardly and downwardly of said second guide member, a pivot pin connecting said two chain sections together and bearing against the lower end of said first guide member to effect raising and lowering of said first guide member relatively to said second guide member as the driving sprocket moves the chain, and means on each link of the chain holding the links thereof above the driving sprocket in longitudinal alignment one with another to form an upright pusher while permitting the links of the chain to pivot relatively to one another to pass around the driving sprocket.

2. An elevating device as claimed in claim 1 further comprising a central roller carried on each link of the chain, a rail extending along said first guide member and engaged by said central rollers in said one chain section, laterally spaced rollers on each link of said one chain section and engaging said first guide member, laterally-spaced rollers in each link of said other chain section and engaging said second guide member.

3. An elevating device as claimed in claim 2 including further longitudinally-spaced guide rollers positioned between said first and second guide means.

4. An elevating device as claimed in claim 1 including telescopic tubular mast sections in which said first and second guide members are positioned.

5. A pair of elevating devices as claimed in claim 1 including a common driving motor drivingly connected in synchronism to each said driving sprocket, the said one chain section of each chain connected to the same member to be elevated.

6. An elevating device for raising and lowering a cabin of a transfer vehicle of the type used for loading and unloading aircraft, the elevating device comprising a plurality of chain links pivotally connected together to form a chain having two sections arranged end-to-end, an upright first guide member supporting one of said chain sections for upward and downward movement, said one chain section engaging at a position above said first guide member a cabin to be raised and lowered with respect to an aircraft hatchway, a second upright guide member mounted on said transfer vehicle and supporting the other of said chain sections for upward and downward movement relatively thereto, means guiding said first guide member for telescopic sliding relatively to said second guide member, a driving sprocket mounted beneath said second guide member and engaging the chain whereby said chain is movable upwardly and downwardly of said second guide member, a pivot pin connecting said two chain sections together and bearing against the lower end of said first guide member to effect raising and lowering of said first guide member relatively to said second guide member as the driving sprocket moves the chain, and means on each link of the chain holding the links thereof above the driving sprocket in longitudinal alignment one with another to form an upright pusher while permitting the links of the chain to pivot relatively to one another to pass around the driving sprocket.

7. An elevating device as claimed in claim 6 including telescopic tubular mast sections in which said first and second guide members are positioned.

* * * * *